(12) United States Patent
Houser et al.

(10) Patent No.: US 11,362,492 B2
(45) Date of Patent: Jun. 14, 2022

(54) CABLE PREPARATION MACHINE HAVING ARCING CONTOUR BLADES

(71) Applicant: TE Connectivity Services GmbH, Schaffhausen (CH)

(72) Inventors: Matthew Steven Houser, Hummelstown, PA (US); Michael Morris, Harrisburg, PA (US); Christopher John Gavlak, Mechanicsburg, PA (US); Joseph Francis Stachura, Lebanon, PA (US); Gary Lee Deck, Bethel, PA (US)

(73) Assignee: TE CONNECTIVITY SERVICES GMBH

( * ) Notice: Subject to any disclaimer, the term of this patent is extended or adjusted under 35 U.S.C. 154(b) by 0 days.

(21) Appl. No.: 17/325,542

(22) Filed: May 20, 2021

(65) Prior Publication Data

US 2021/0273428 A1   Sep. 2, 2021

Related U.S. Application Data

(63) Continuation of application No. 16/360,433, filed on Mar. 21, 2019, now abandoned.

(51) Int. Cl.
   *H02G 1/12* (2006.01)
(52) U.S. Cl.
   CPC .......... *H02G 1/1265* (2013.01); *H02G 1/127* (2013.01)
(58) Field of Classification Search
   CPC .... H02G 1/1265; H02G 1/127; H02G 1/1202;
   H02G 1/1219; H02G 1/1221; H02G
   1/1224; H02G 1/12; H02G 1/1204; H02G
   1/1226; H02G 1/1278; H02G 1/1297;
   G01R 43/28; H01R 9/0518; G02B 6/245;
   G02B 6/25; F16F 9/3272; B23D 21/08;
   (Continued)

(56) References Cited

U.S. PATENT DOCUMENTS 2,789,452 A   4/1957   Miller
2,981,129 A   4/1961   Adams
(Continued)

FOREIGN PATENT DOCUMENTS

CN   201797226 U   4/2011
CN   106451253 A   2/2017
(Continued)

OTHER PUBLICATIONS

International Search Report and Written Opinion for corresponding application No. PCT/IB2020/052353 dated Jul. 22, 2020.

*Primary Examiner* — Ghassem Alie (57) ABSTRACT

A cable preparation machine includes a frame forming a cable cutting zone, the frame having a cable opening along a cable axis at the cable cutting zone receiving an end of a cable. The cable preparation machine includes a pulley assembly rotatably coupled to the frame about the cable axis and a drive assembly operably coupled to the pulley assembly to rotate the pulley assembly about the cable axis. The cable preparation machine includes a blade assembly operably coupled to the pulley assembly and rotated with the pulley assembly about the cable axis. The blade assembly includes a blade having an arcuate cutting edge configured for cutting an insulator from the end of the cable.

20 Claims, 9 Drawing Sheets

(58) Field of Classification Search
CPC ............. Y10T 83/9372; Y10T 83/8796; Y10T 83/9784; Y10T 83/293; Y10T 83/0378; Y10T 83/0363
USPC ........... 83/651, 880, 886, 883, 885, 884, 78; 81/9.51, 9.42, 9.41, 9.4, 9.44; 30/90.9, 30/90.8, 91.1, 91.2, 90.7, 96, 101.102, 94, 30/95

See application file for complete search history.

(56) References Cited

U.S. PATENT DOCUMENTS

| | | | |
|---|---|---|---|
| 3,892,145 A | | 7/1975 | Richie |
| 4,449,298 A | * | 5/1984 | Putz .................... H02G 1/1226 30/90.1 |
| 4,543,717 A | | 10/1985 | Luka |
| 5,010,797 A | | 4/1991 | Stepan |
| 7,597,030 B2 | | 10/2009 | Stepan et al. |
| 9,929,548 B2 | * | 3/2018 | Troy .................... H02G 1/1226 |
| 2011/0219927 A1 | * | 9/2011 | Locher ................ H02G 1/1251 83/78 |
| 2018/0090918 A1 | * | 3/2018 | Houser ................ H02G 1/1265 |
| 2018/0138673 A1 | * | 5/2018 | Messina ............... H02G 1/1265 |
| 2018/0152009 A1 | * | 5/2018 | Manser ................ H02G 1/1224 |
| 2020/0076148 A1 | | 3/2020 | Houser et al. |

FOREIGN PATENT DOCUMENTS

| | | |
|---|---|---|
| DE | 3015606 A1 | 4/1980 |
| DE | 202008017576 U1 | 3/2010 |
| KR | 2020090012235 U | 2/2009 |

* cited by examiner

CABLE PREPARATION MACHINE HAVING ARCING CONTOUR BLADES

CROSS REFERENCE TO RELATED APPLICATIONS

This application is a continuation application of and claims benefit to U.S. application Ser. No. 16/360,433, filed 21 Mar. 2019, titled "CABLE PREPARATION MACHINE HAVING ARCING CONTOUR BLADES", the subject matter of which is herein incorporated by reference in its entirety.

BACKGROUND OF THE INVENTION

The subject matter herein relates generally to a cable preparation machine.

Cables are used in many applications. Typically, an end of the cable is prepared for termination to a terminal, contact, connector, circuit board or other component by exposing the conductor(s) of the cable. For example, with a coaxial or shielded cable, the cable typically includes a center conductor, an inner insulator, an outer conductor, such as in the form of a foil and a cable braid, and an outer insulator, such as a cable jacket. Cable preparation processes typically involve removal of the various layers of the cable for termination of the conductive layers to the component. For example, the outer insulator is stripped to expose the cable braid, the cable braid is stripped to expose the inner insulator and the inner insulator is stripped to expose the inner conductor.

Conventional cable preparation processes require several different process steps and several different preparation machines to perform all of the preparation steps. For example, the cable is typically inserted into a first machine to remove the outer insulator. The cable is then removed from the first machine and inserted into a second machine to remove the cable braid. The cable is removed from the second machine and then inserted into a third machine, or back into the first machine, to remove the inner insulator. Different steps and different machines are used because different preparation operations on the same cable need different cutting blades and other considerations performed in independent machines. Conventional cable preparation processes are time-consuming and expensive.

Additionally, with some known cable preparation machines, removal of layers may damage other layers of the cable. For example, conventional cable preparation machines utilize a pair of slicing blades movable in opposing directions to slice through the insulators. However, such slicing blades may nick or cut the cable braid or the inner conductor strands as the slicing blades are closed around the cable to slice through the insulator. The damage caused to the cable braid or the inner conductor may be unacceptable to end users. Additionally, the linear slicing blades are designed to cut and remove an insulator having one specific diameter. Separate blades are needed for cutting an inner insulator and an outer insulator or for cutting insulators of different diameter cables.

A need remains for a cable preparation machine capable of removing insulator layers in a cost effective and reliable manner.

BRIEF DESCRIPTION OF THE INVENTION

In one embodiment, a cable preparation machine is provided including a frame forming a cable cutting zone, the frame having a cable opening along a cable axis at the cable cutting zone receiving an end of a cable. The cable preparation machine includes a pulley assembly rotatably coupled to the frame about the cable axis and a drive assembly operably coupled to the pulley assembly to rotate the pulley assembly about the cable axis. The cable preparation machine includes a blade assembly operably coupled to the pulley assembly and rotated with the pulley assembly about the cable axis. The blade assembly includes a blade having an arcuate cutting edge configured for cutting an insulator from the end of the cable.

In another embodiment, a cable preparation machine is provided including a frame forming a cable cutting zone, the frame having a cable opening along a cable axis at the cable cutting zone receiving an end of a cable. The cable preparation machine includes a pulley assembly rotatably coupled to the frame about the cable axis. The pulley assembly includes a front pulley and a rear pulley rotatable relative to the front pulley. The rear pulley has an actuator. The cable preparation machine includes a blade assembly operably coupled to the pulley assembly. The blade assembly has a blade arm pivotably coupled to the front pulley being operably coupled to the actuator of the rear pulley. The actuator pivots the blade arm relative to the front pulley upon relative rotation of the front pulley and the rear pulley. The blade assembly has a blade extending from the blade arm having an arcuate cutting edge configured for cutting an insulator of the cable. The cable preparation machine includes a drive assembly operably coupled to the pulley assembly to rotate the pulley assembly about the cable axis. The drive assembly is operably coupled to the front pulley to rotate the front pulley and is operably coupled to the rear pulley to rotate the rear pulley. The drive assembly is configured to rotate the front and rear pulleys independent of each other to actuate the blade assembly.

In a further embodiment, a cable preparation machine is provided including a frame forming a cable cutting zone, the frame having a cable opening along a cable axis at the cable cutting zone receiving an end of a cable. The cable preparation machine includes a drive assembly having a first drive unit and a second drive unit. The cable preparation machine includes a pulley assembly rotatably coupled to the frame about the cable axis. The pulley assembly includes a front pulley operably coupled to the first drive unit and a rear pulley operably coupled to the second drive unit. The front pulley is rotatable in a forward direction and a reverse direction by the first drive unit. The rear pulley is rotatable in a forward direction and a reverse direction by the second drive unit independent of the rotation of the front pulley. The cable preparation machine includes a blade assembly operably coupled to the pulley assembly having a blade pivotably coupled to the front pulley. The blade has an arcuate cutting edge configured for cutting an insulator of the cable.

DETAILED DESCRIPTION OF THE INVENTION

Figure 1:
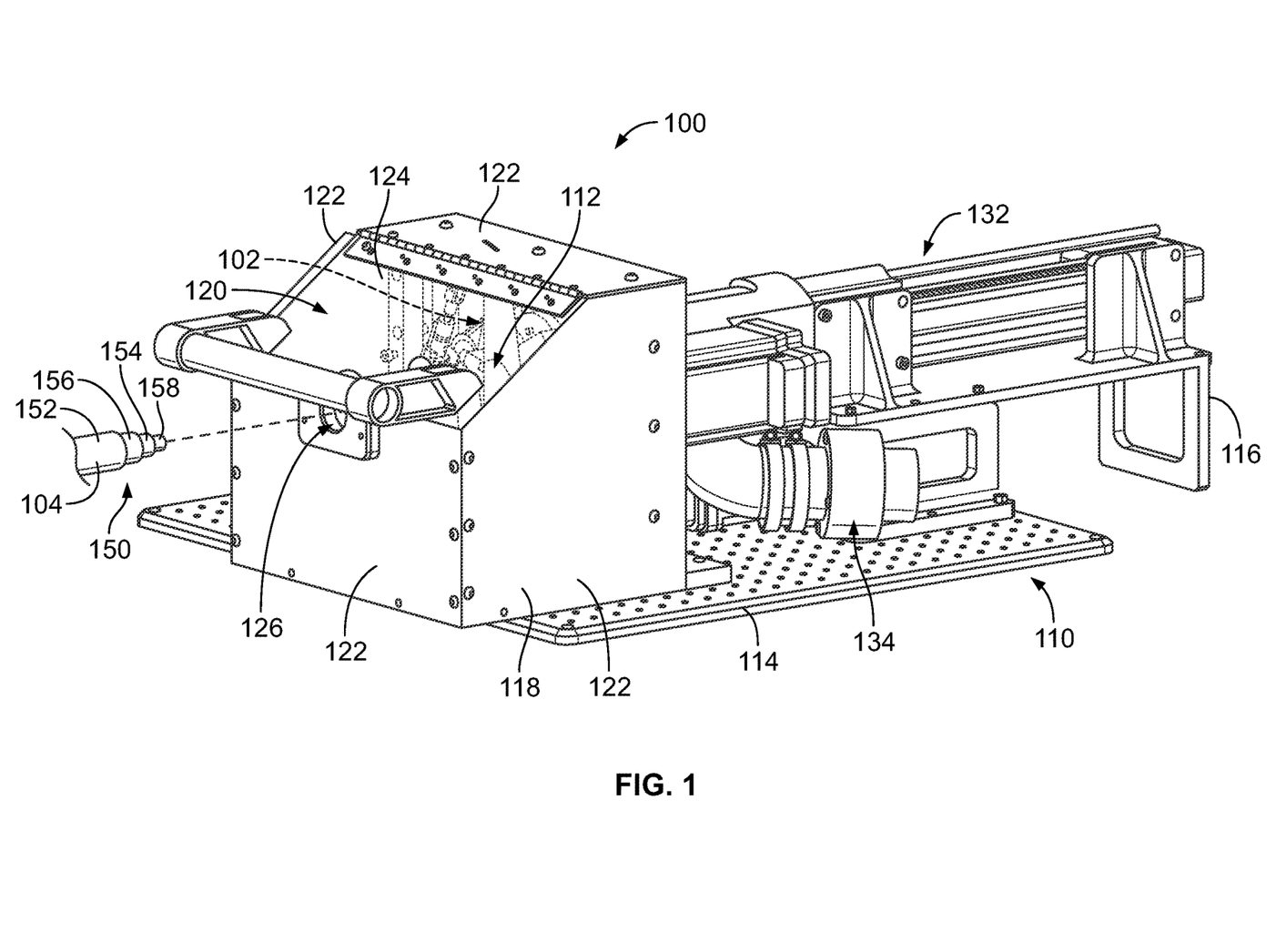
FIG. 1 illustrates a cable preparation machine in accordance with an exemplary embodiment.

FIG. 1 illustrates a cable preparation machine 100 in accordance with an exemplary embodiment. The cable preparation machine 100 includes a cable cutting device 102 configured to cut and remove one or more insulators from an end 150 of a cable 104, such as an outer insulator 152 (for example, a cable jacket) and/or an inner insulator 154. The cable cutting device 102 may be configured to cut and remove a cable braid 156 from the end 150 of the cable 104. The inner insulator 154 separates the cable braid 156 from an inner conductor 158 of the cable 104. The cable braid 156 provides electrical shielding for the inner conductor 158. The inner conductor 158 may be a solid core wire or a stranded wire. Optionally, the cable preparation machine 100 may be configured to flare the cable braid 156. Optionally, the cable preparation machine 100 may be configured to fold the cable braid 156 at the end of the cable 104. The cable preparation machine 100 is able to prepare the end of the cable 104 without moving the cable 104 between different machines. For example, the cable cutting device 102 includes different cutting blades for cutting the insulator(s) 152, 154 and the cable braid 156 during different cable cutting steps within the cable preparation machine 100 without removing the cable 104 from the cable cutting zone of the cable cutting device 102. As such, the end of the cable 104 may be processed and prepared quickly and efficiently using a single machine.

The cable preparation machine 100 includes a frame 110 supporting the various components of the cable preparation machine 100. The frame 110 forms a cable cutting zone 112 where the end of the cable 104 is processed and prepared. For example, the cable cutting device 102 is located at the cable cutting zone 112. The frame 110 includes a base 114 and support members 116 mounted to the base 114. The support members 116 support various components of the cable preparation machine 100. In an exemplary embodiment, the frame 110 includes a cabinet 118 housing the cable cutting device 102 in a chamber 120 of the cabinet 118. The cabinet 118 surrounds the cable cutting device 102 to prevent injury to the operator of the cable preparation machine 100. The cabinet 118 includes one or more walls 122 surrounding the chamber 120. Optionally, the cabinet 118 includes a door 124 for accessing the chamber 120. In an exemplary embodiment, the cabinet 118 includes a cable opening 126 through one or more of the walls 122 to allow the cable 104 to be loaded into the chamber 120 to the cable cutting zone 112.

In an exemplary embodiment, the cable preparation machine 100 may include a cable holder 130 (shown in FIG. 14) that holds the cable 104 during the cable preparation process. For example, the cable holder 130 holds the cable 104 in the cable cutting zone 112 for removal of the insulator(s) 152, 154 and the cable braid 156. Optionally, the cable holder 130 is movable relative to the frame 110 to position the cable 104 in the cable cutting zone 112. The cable holder 130 may be located forward of the cabinet in various embodiments.

In an exemplary embodiment, the cable preparation machine 100 includes a braid manipulation device 132 for preparing the end of the cable 104, such as for manipulating the cable braid 156 during cable preparation. The braid manipulation device 132 may include a mandrel or other component that may be inserted into or into the end of the cable 104. The mandrel may be used to flare the cable braid 156 during processing of the end of the cable 104. The mandrel may be used to fold the cable braid 156 backwards during processing of the end of the cable 104. In the illustrated embodiment, the braid manipulation device 132 is located behind the cabinet 118.

Optionally, the cable preparation machine 100 may include a chute 134 for discarding the removed slugs of insulator(s) 152, 154 and/or the removed slugs of cable braid 156 after being cut and removed from the end of the cable 104. The chute 134 transfers the discarded slugs away from the cable cutting zone 112.

Figure 2:
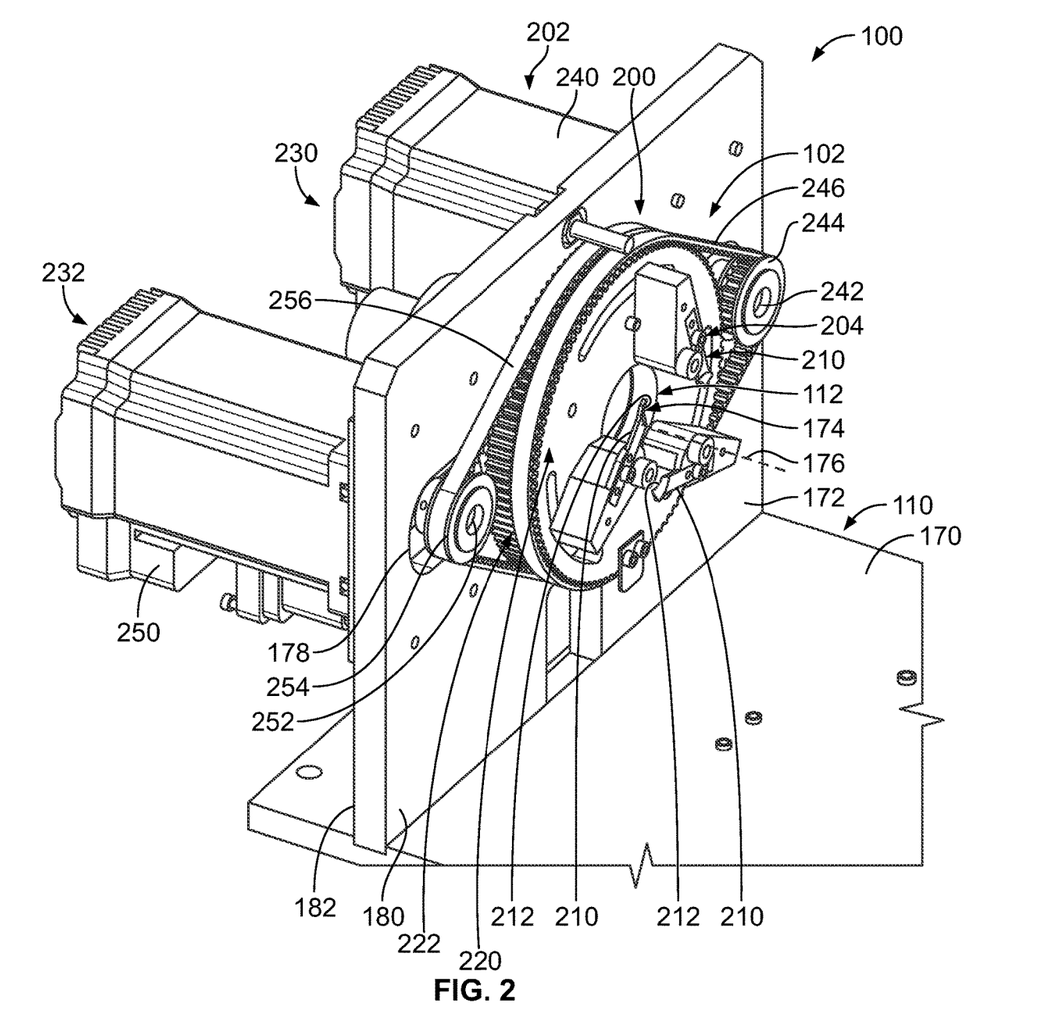
FIG. 2 is a perspective view of a portion of the cable preparation machine showing a cable cutting device in accordance with an exemplary embodiment.

FIG. 2 is a perspective view of a portion of the cable preparation machine 100 showing the cable cutting device 102 in accordance with an exemplary embodiment. FIG. 2 illustrates a base 170 and a support wall 172 of the frame 110 used to support the cable cutting device 102. The support wall 172 of the frame 110 includes a cable opening 174 along a cable axis 176 at the cable cutting zone 112 that receives the end 150 of the cable 104 (shown in FIG. 1).

The support wall 172 of the frame 110 includes drive openings 178 therethrough between a front 180 and a rear 182 of the support wall 172. The drive openings 178 may be located generally on opposite sides of the cable opening 174; however, other locations are possible in alternative embodiments, such as above and/or below the cable opening 174.

The cable cutting device 102 includes a pulley assembly 200, a drive assembly 202 and a blade assembly 204. The pulley assembly 200 is rotatably coupled to the support wall 172 of the frame 110 about the cable axis 176. The pulley assembly 200 is located forward of the front 180 of the support wall 172. The drive assembly 202 is operably coupled to the pulley assembly 200 to rotate the pulley assembly 200 about the cable axis 176. The blade assembly 204 is operably coupled to the pulley assembly 200 and is rotated with the pulley assembly 200 about the cable axis 176.

In various embodiments, the blade assembly 204 is configured for cutting the outer insulator 152 from the end 150 of the cable 104 in one cutting configuration of the cable cutting device 102 when the cable 104 is positioned in the cable opening 174. Optionally, the blade assembly 204 is configured for removing the outer insulator slug from the end 150 of the cable 104 after being cut, such as by holding the insulator slug in the cable opening 174 as the cable 104 is drawn out of the cable opening 174 until the insulator slug falls off the end of the cable 104. In various embodiments, the blade assembly 204 is configured for cutting the inner insulator 154 from the end 150 of the cable 104 in another cutting configuration of the cable cutting device 102 when the cable 104 is positioned in the cable opening 174. Optionally, the blade assembly 204 is configured for removing the inner insulator slug from the end 150 of the cable 104 after being cut, such as by holding the insulator slug in the cable opening 174 as the cable 104 is drawn out of the cable opening 174 until the insulator slug falls off the end of the cable 104. The cable 104 may be positioned in the cable opening 174 for removal of the cable braid 156 or manipulation of the cable braid 156, such as flaring or folding of the cable braid 156. The drive assembly 202, the pulley assembly 200 and the blade assembly 204 are operated differently in the different cutting configurations.

In an exemplary embodiment, the blade assembly 204 includes multiple cutting blades 210 disposed about the cable axis 176. For example, the blades 210 may triangulate the cable 104 within the cable opening 174 during the cutting operations to ensure that the cable 104 remains centered within the cable opening 174 for consistent cutting depth by the blades 210. The blades 210 are configured for cutting the insulators 152, 154 of the cable 104. In the illustrated embodiment, the blades 210 are fixed blades having arcuate cutting edges 212 at radially inner edges of the blades 210 for cutting the insulators 152, 154. For example, the blades 210 may be sickle shaped. The blades 210 may be wedge shaped being narrower at the arcuate cutting edges 212 and wider at the radially outer ends of the blades 210 opposite the arcuate cutting edges 212. The arcuate cutting edges 212 are concave. The arcuate cutting edges 212 have a radius of curvature that closely matches a radius of curvature of the cable 104. The arcuate cutting edges 212 may have a radius of curvature that more closely matches the radius of curvature of the outer insulator 152, such as in inner diameter of the outer insulator 152, or may have a radius of curvature that more closely matches the radius of curvature of the inner insulator 154. Optionally, the blade assembly 204 may include braid blades (not shown) configured for cutting the cable braid 156 of the cable 104.

In an exemplary embodiment, the pulley assembly 200 includes a front pulley 220 operably coupled to a first drive unit 230 of the drive assembly 202 and a rear pulley 222 operably coupled to a second drive unit 232 of the drive assembly 202. The front pulley 220 is forward of the rear pulley 222 and both pulleys 220, 222 are located forward of the front 180 of the support wall 172 of the frame 110. The front pulley 220 is rotatable independent of and relative to the rear pulley 222. For example, the first drive unit 230 may be operated independently of the second drive unit 232, and the second drive unit 232 may be operated independently of the first drive unit 230. For example, the first drive unit 230 may be operated to rotate the front pulley 220 in a forward direction and in a reverse direction. Similarly, the second drive unit 232 may be operated to rotate the rear pulley 222 in a forward direction and in a rearward direction. During operation, the front pulley 220 may be operated at a different rate than the rear pulley 222 or may be operated at the same rate as the rear pulley 222. In certain operations, the front pulley 220 and the rear pulley 222 may be operated in different directions. In certain operations, the front pulley 220 or the rear pulley 222 may remain stationary while the other of the front pulley 220 or the rear pulley 222 may be operated in a forward direction or a rearward direction. When the front pulley 220 and the rear pulley 222 are operated at different speeds and/or in different directions, the pulley assembly 200 actuates the blade assembly 204, such as for opening or closing the blades 210 around the cable 104.

In an exemplary embodiment, the blades 210 are rotated with the pulley assembly 200 about the cable axis 176 to position the blades 210 relative to the cable 104 for cutting the cable 104. The blades 210 are positionable at different rotational positions relative to the cable 104, such as for cutting at different locations around the cable 104. In various embodiments, the blades 210 may be driven in a radially cutting direction, such as in a chopping action, to cut through the insulators 152, 154. The blades 210 may chop inward, deflect back outward (or retract), rotate to a new rotational position, and then again chop inward (any number of times) to cut through the insulators 152, 154. In other various embodiments, the blades 210 may be driven in a rotating cutting direction, such as in a slicing action, to cut through the insulators 152, 154.

In the illustrated embodiment, the first drive unit 230 of the drive assembly 202 includes a first drive motor 240, a first drive shaft 242, a first drive pulley 244 and a first drive belt 246 coupled to the front pulley 220. The drive motor 240 is located rearward of the support wall 172 and the drive pulley 244 is located forward of the support wall 172. The drive shaft 242 passes through the drive opening 178. The drive motor 240 rotates the drive shaft 242, which rotates the drive pulley 244. The drive motor 240 may be rotated in a forward direction or a reverse direction. As the drive pulley 244 is rotated, the drive belt 246 rotates the front pulley 220. In various embodiments, the drive motor 240 may be a stepper motor. In other various embodiments, the drive motor 240 may be a servo motor. Other types of drivers may be used in alternative embodiments, such as a hydraulic driver, a pneumatic driver, or another type of drive unit. The drive system may utilize other intermediary structures other than the drive belt 246 between the drive pulley 244 and the front pulley 220 to transfer rotation of the drive pulley 244 to rotation of the front pulley 220, such as a chain, a gear, and the like. Other types of drive systems may be used in alternative embodiments. For example, the drive pulley 244 may define a drive gear directly engaging the front pulley 220. For example, the drive pulley 244 may include teeth and the front pulley 220 may include teeth that mesh with the teeth of the drive pulley 244 such that the front pulley 220 is directly driven by the drive pulley 244 rather than being driven by an intermediary structure.

In the illustrated embodiment, the second drive unit 232 of the drive assembly 202 includes a second drive motor 250, a second drive shaft 252, a second drive pulley 254 and a second drive belt 256 coupled to the rear pulley 222. The drive motor 250 is located rearward of the support wall 172 and the drive pulley 254 is located forward of the support wall 172. The drive shaft 252 passes through the drive opening 178. The drive motor 250 rotates the drive shaft 252, which rotates the drive pulley 254. The drive motor 250 may be rotated in a forward direction or a reverse direction. As the drive pulley 254 is rotated, the drive belt 256 rotates the front pulley 220. In various embodiments, the drive motor 250 may be a stepper motor. In other various embodiments, the drive motor 250 may be a servo motor. Other types of drivers may be used in alternative embodiments, such as a hydraulic driver, a pneumatic driver, or another type of drive unit. The drive system may utilize other intermediary structures other than the drive belt 256 between the drive pulley 254 and the rear pulley 222 to transfer rotation of the drive pulley 254 to rotation of the rear pulley 222, such as a chain, a gear, and the like. Other types of drive systems may be used in alternative embodiments. For example, the drive pulley 254 may define a drive gear directly engaging the rear pulley 222. For example, the drive pulley 254 may include teeth and the rear pulley 222 may include teeth that mesh with the teeth of the drive pulley 254 such that the rear pulley 222 is directly driven by the drive pulley 254 rather than being driven by an intermediary structure.

The drive assembly 202 is operated to rotate the pulley assembly 200 about the cable axis 176. The blades 210 are rotatable with the pulley assembly 200 around the cable axis 176. The drive assembly 202 rotates the pulley assembly 200 in a first drive configuration to actuate the blades 210, such as to open or close the blades 210 relative to the cable 104. The first drive configuration is used for cutting the outer insulator 152 of the cable 104. In an exemplary embodiment, when the drive assembly 202 is operated in the first drive configuration, the blade assembly 204 is operated in the first cutting configuration to a first cutting depth. The drive assembly 202 rotates the pulley assembly 200 in a second drive configuration to actuate the blades 210, such as to open or close the braid blades 210 relative to the cable 104, to a second cutting depth. The second drive configuration is used for cutting the inner insulator 154 of the cable 104, such as after the cable braid 156 is removed from the end of the cable 104.

Figure 3:
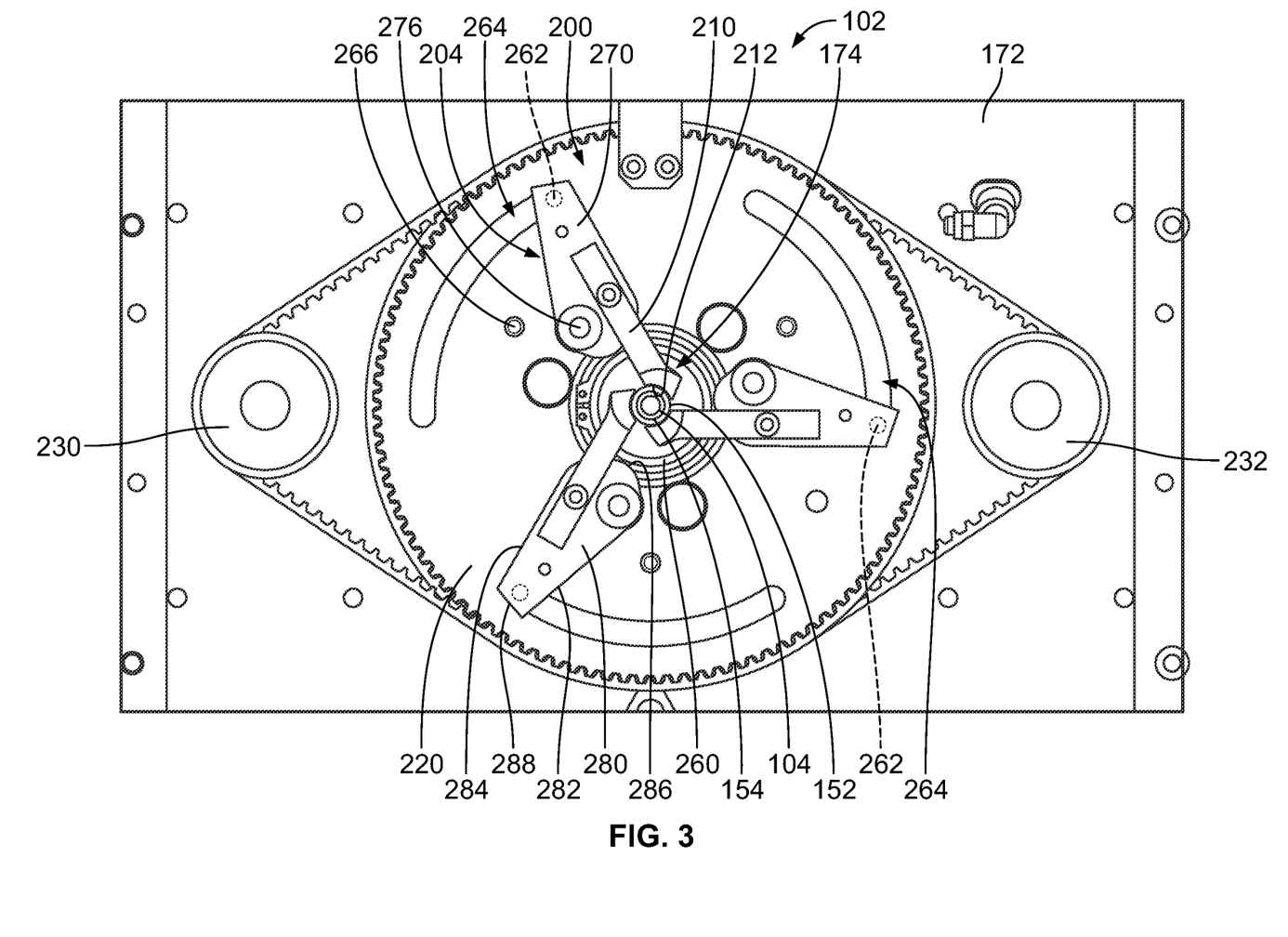
FIG. 3 is a front view of the cable cutting device in accordance with an exemplary embodiment.

FIG. 3 is a front view of the cable cutting device 102 in accordance with an exemplary embodiment. The pulley assembly 200 includes a hub 260 received in the cable opening 174 of the support wall 172. The hub 260 is hollow and configured to receive the end 150 of the cable 104 (shown in FIG. 1). The front pulley 220 and the rear pulley 222 are rotatable on the hub 260.

The rear pulley 222 includes actuators 262 (shown in phantom) extending forward from the rear pulley 222 into slots 264 in the front pulley 220. The actuators 262 may be actuator pins in various embodiments. However, other types of actuators may be used in alternative embodiments. The actuators 262 extend through the front pulley 220 to engage the blade assembly 204. The actuators 262 actuate the blade assembly 204 during operation of the cable cutting device 102. For example, as the front pulley 220 rotates relative to the rear pulley 222, the actuators 262 engage the blade assembly 204 to actuate the blade assembly 204. In various embodiments, when the front pulley 220 rotates faster than the rear pulley 222, the blades 210 are opened and when the rear pulley 222 rotates faster than the front pulley 220, the blades are closed around the cable 104. However, when the front and rear pulleys 220, 222 are rotated at the same rate, the blades 210 are neither opened nor closed, but rather are rotated with the front and rear pulleys 220, 222.

In an exemplary embodiment, the pulley assembly 200 has a normal position wherein the front pulley 220 is rotationally centered with respect to the rear pulley 222. The front pulley 220 may include hard stop pins 266 extending forward of the front pulley 220 that engage the blade assembly 204 to position the blade assembly 204 in the normal position. The location of the hard stop pins 266 in the slots 264 may define the normal position, which may be varied by moving the hard stop pins 266 within the slots 264. In other various embodiments, rather than using hard stop pins 266 the ends of the slots 264 may define the hard stops to define the normal position. The pulley assembly 200 may be operated to advance the blades 210 from the normal position. For example, relative rotation of the front pulley 220 with respect to the rear pulley 222 may cause the blades 210 to advance inward toward the cable 104. The pulley assembly 200 may be operated to retract the blades 210 to the normal position. For example, relative rotation of the front pulley 220 with respect to the rear pulley 222 may cause the blades 210 to retract away from the cable 104.

The blade assembly 204 includes blade arms 270 holding the blades 210. The blade arms 270 are pivotably coupled to the front pulley 220 of the pulley assembly 200. The blade arms 270 pivot relative to the front pulley 220 to open or close the corresponding blades 210. The blade arm 270 holds the corresponding blade 210 for cutting the insulators 152, 154. In the illustrated embodiment, the blade assembly 204 includes three blade arms 270 with each blade arm 270 holding the corresponding blade 210 to triangulate the blades 210 around the cable opening 174. Greater or fewer blade arms 270 may be provided in alternative embodiments.

The blade arms 270 are pivotably coupled to the front pulley 220 by an arm pivot pin 276. The blade arms 270 are pivoted relative to the front pulley 220 of the pulley assembly 200 to change a cutting depth of the corresponding blade 210. For example, the relative movement (for example, angular position) of the front pulley 220 relative to the rear pulley 222 determines the amount of pivot of the blade arm 270, and thus the location of the blade 210 relative to the cable opening 174 to control the cutting depth of the blade 210. The cable cutting device 102 may accommodate cables 104 of various diameters by changing the cutting depth of the blades 210. In an exemplary embodiment, the arm pivot pin 276 is offset from the actuator 262. When the actuator 262 engages and drives against the blade arm 270, the blade arm 270 is pivoted about the arm pivot pin 276 to close the blade 210 for cutting the cable 104.

The actuator 262 causes the blade arm 270 to pivot when the front pulley 220 is rotated at a different rate than the rear pulley 222. In a first drive configuration, the front pulley 220 is rotated at a faster rate than the rear pulley 222 to actuate the blade assembly 204. For example, the pulley assembly 200 may be used to retract (for example, open) the blade 210 away from the cable 104 (for example, from a closed position back to the normal position) in the first drive configuration. In a second drive configuration, the rear pulley 222 is rotated at a faster rate than the front pulley 220 to actuate the blade assembly 204. For example, the pulley assembly 200 may be used to advance the blade 210 toward the cable 104 (for example, from the normal position to a cutting position) for closing the blade 210 on the cable 104 for cutting the insulator 152 or 154. In a third drive configuration, the front pulley 220 and the rear pulley 222 are rotated at the same rate. In the third drive configuration, the blade arm 270 remains stationary relative to the front pulley 220 and thus does not open or close when the front pulley 220 is rotated at the same speed as the rear pulley 222. For example, the blade arm 270 may be repositioned relative to the cable 104 as the pulley assembly 200 is driven in the third drive configuration. In various embodiments, the blade 210 may be held at a constant cutting depth and rotated with the front pulley 220 when the front pulley 220 and the rear pulley 222 are rotated at the same speed.

In an exemplary embodiment, the actuator 262 is used to return the blade arm 270 to the normal position from the advanced position. For example, relative rotation of the rear pulley 222 relative to the front pulley 220 returns the blade arms 270. However, in alternative embodiments, each blade arm 270 is coupled to an arm return spring (not shown) that pulls the blade arm 270 back to the normal position. The arm return spring biases the blade arm 270 to an open position. As the actuator 262 is retracted, the arm return spring opens or returns the blade arm 270 to the normal position against the hard stop pin 266. The hard stop pin 266 holds the blade arm 270 in the normal position. The arm return spring returns the blade arm 270 to a position where the blade arm 270 engages the hard stop pin 266, defining the normal position. The blade arm 270 is unable to open further than the normal position because the blade arm 270 bottoms out against the hard stop pin 266.

In operation, when the rear pulley 222 is rotated in a first direction (for example, clockwise) relative to the first pulley 220, the actuator 262 presses against the corresponding blade arm 270 to actuate the blade arm 270 and close the blade 210 around the cable 104. When the rear pulley 222 is rotated in an opposite second direction (for example, counterclockwise) relative to the first pulley 220, the actuator 262 moves back toward the normal position in the slot 264. The actuator 262 or the arm return spring returns the blade arm 270 to the normal position against the hard stop pin 266.

In an exemplary embodiment, each blade arm 270 includes a body 280 extending between a first side 282 and a second side 284. The body 280 extends between an inner end 286 and an outer end 288. The first side 282 faces the hard stop pin 266. In the normal position, the first side 282 abuts against the hard stop pin 266. In the illustrated embodiment, the arm pivot pin 276 is located proximate to the first side 282 and proximate to the inner end 286. Other locations are possible in alternative embodiments. In an exemplary embodiment, the actuator 262 is received in a pocket in the rear of the blade arm 270 to cause advancing and retracting movement of the blade arm 270 as the rear pulley 222 is moved relative to the front pulley 220 in the advancing direction or in the retracting direction. However, in alternative embodiments, the actuator 262 may engage the first side 282 of the blade arm 270, such as proximate to the outer end 288, to force advancing movement of the blade arm 270. In such embodiments, the return spring may be used to retract the blade arm 270. Other actuator locations are possible in alternative embodiments. In the illustrated embodiment, the blade 210 is mounted to the blade arm 270 proximate to the second side 284 at the inner end 286. The blade 210 extends inward from the inner end 286. When the blade arm 270 is pivoted, the cutting edge 212 of the blade 210 is closed inward toward the cable opening 174 to engage and cut the cable 104.

In an exemplary embodiment, the drive assembly 202 includes a position sensor assembly for sensing a rotational position of the pulley assembly 200. For example, the position sensor assembly may include a proximity sensor. Other types of position sensors may be used to determine the rotational positions of the front pulley 220 and/or the rear pulley 222. The position sensor assembly may include position sensors fixed to the front pulley 220 and/or to the rear pulley 222. In other various embodiments, the drive motors 240, 250 may be servo motors having internal position sensors for determining rotational positions of the drive units 230, 232 to determine the corresponding rotational positions of the front and rear pulleys 220, 222.

Figure 4:
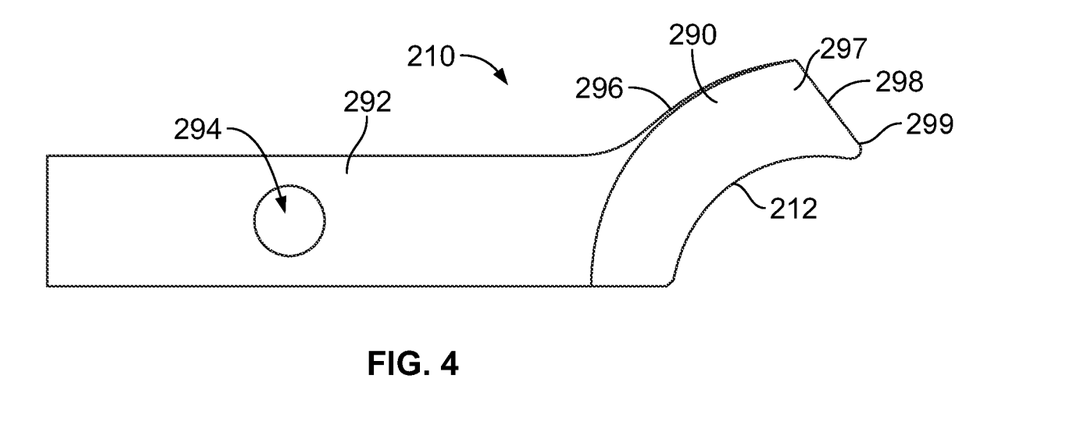
FIG. 4 is a side view of a blade of a blade assembly of the cable cutting device in accordance with an exemplary embodiment.
Figure 5:
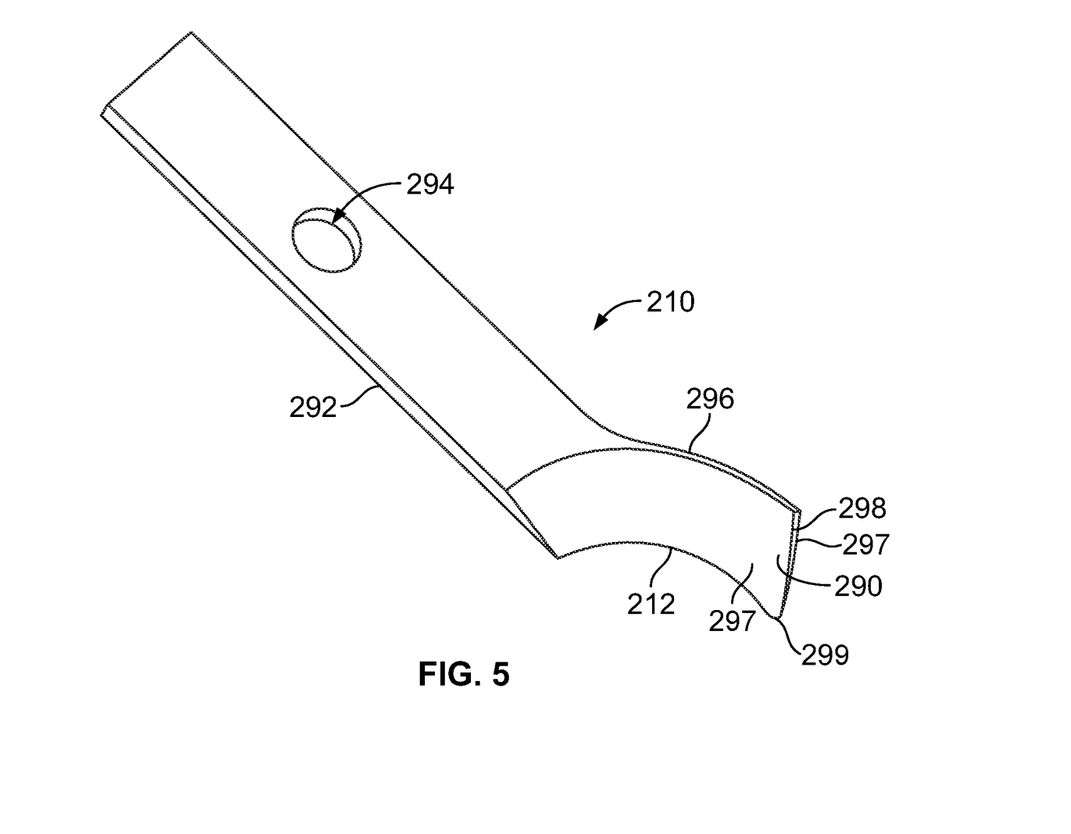
FIG. 5 is a perspective view of the blade in accordance with an exemplary embodiment.

FIG. 4 is a side view of a blade 210 of the blade assembly 204 in accordance with an exemplary embodiment. FIG. 5 is a perspective view of the blade 210 in accordance with an exemplary embodiment. The blade 210 includes a cutting end 290 and a mounting end 292 opposite the cutting end 290. In an exemplary embodiment, the blade 210 is manufactured from a metal material, such as tool steel. The blade 210 may be stamped, formed, milled, molded, die cast, or manufactured by other processes. The blade 210 is manufactured to have the arcuate cutting edge 212 at the cutting end 290.

The blade 210 includes an opening 294 at the mounting end 292 that receives a fastener or other securing feature to secure the blade 210 to the blade arm 270. In the illustrated embodiment, the mounting end 292 is rectangular; however, the mounting end 292 may have other shapes in alternative embodiments.

In the illustrated embodiment, the blade 210 is sickle shaped at the cutting end 290 to form the arcuate cutting edge 212. The arcuate cutting edge 212 is concave. The arcuate cutting edge 212 has a radius of curvature, which may closely match a radius of curvature of the cable 104. The cutting end 290 is wedge shaped being narrower at the cutting edge 212 and wider at a radially outer end 296 of the blade 210 opposite the cutting edge 212. The cutting edge 212 may be thin, such as forming a knife edge configured to cut through the insulators 152, 154 as the blade 210 is chopped into the insulators 152, 154 in a radial cutting direction. Optionally, a distal edge 298 of the cutting end 290 may be wedge shaped, such as defined by side walls 297 being slanted or angled relative to each other and narrowing from the radially outer end 296 to the cutting edge 212. The distal edge 298 may form a cutting edge, such as for slicing through the insulators 152, 154 as the blade 210 is rotated around the cable 104 in a rotating cutting direction. The distal edge 298 and the cutting edge 212 meet at a corner 299. The corner 299 may be pointed in various embodiments. The corner 299 may be rounded in other various embodiments.

Figure 6:
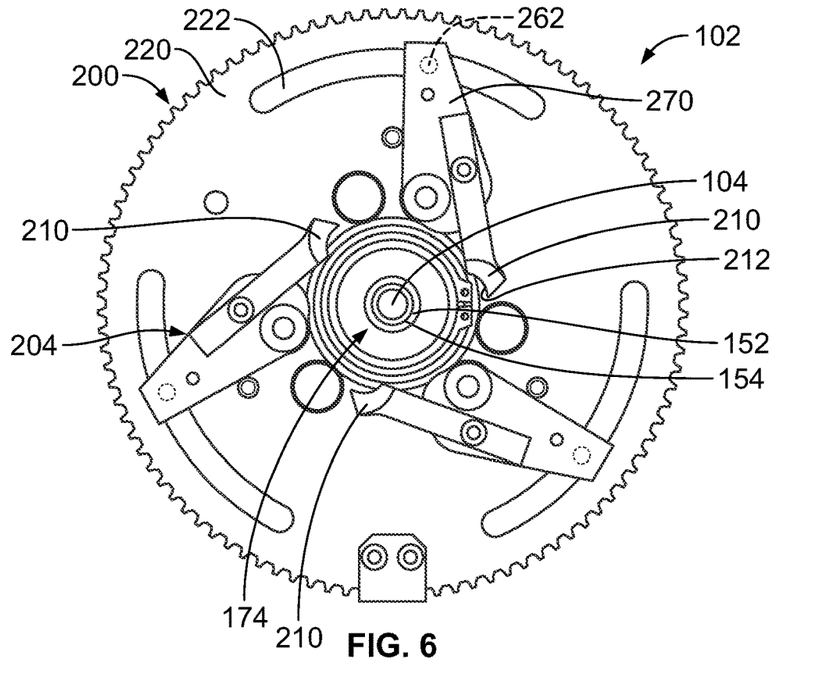
FIG. 6 is a front view of a portion of the cable cutting device in accordance with an exemplary embodiment showing the blades open relative to a cable in a non-cutting configuration.
Figure 7:
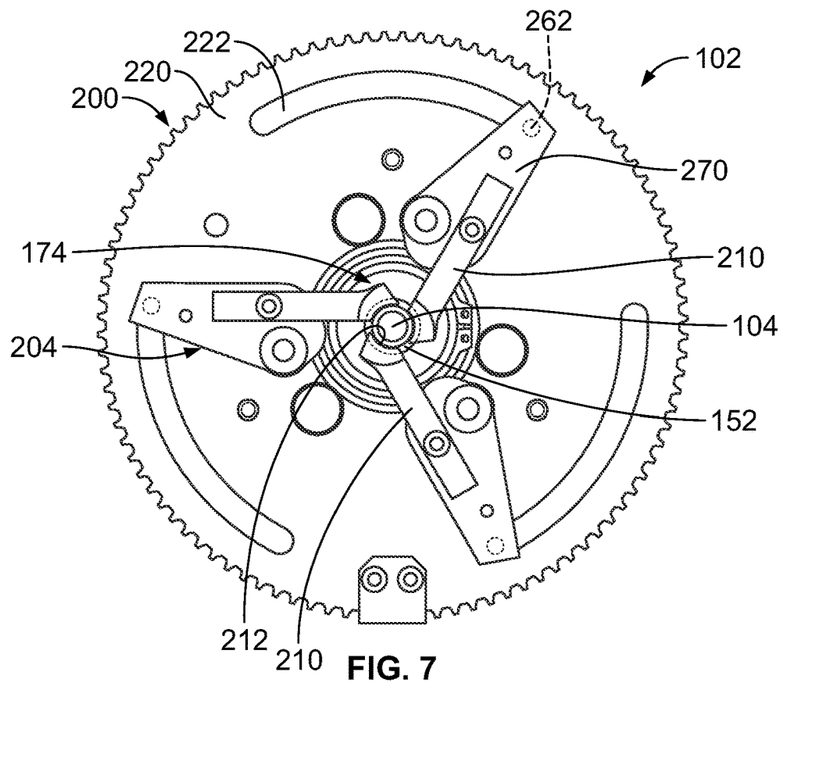
FIG. 7 is a front view of a portion of the cable cutting device in accordance with an exemplary embodiment showing the blades in a first cutting configuration cutting the cable.
Figure 8:
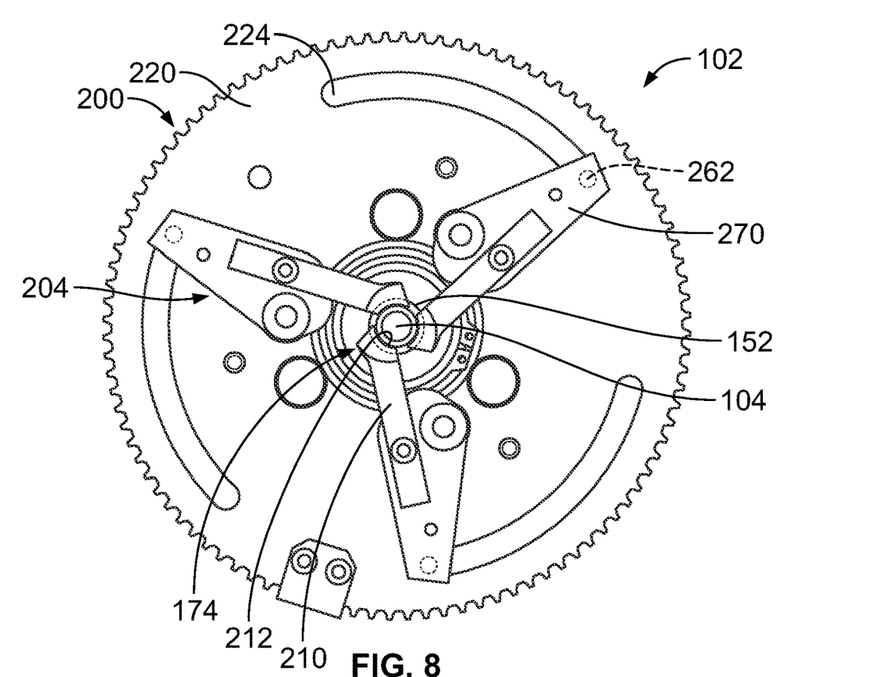
FIG. 8 is a front view of a portion of the cable cutting device in accordance with an exemplary embodiment showing the blades cutting the cable.
Figure 9:
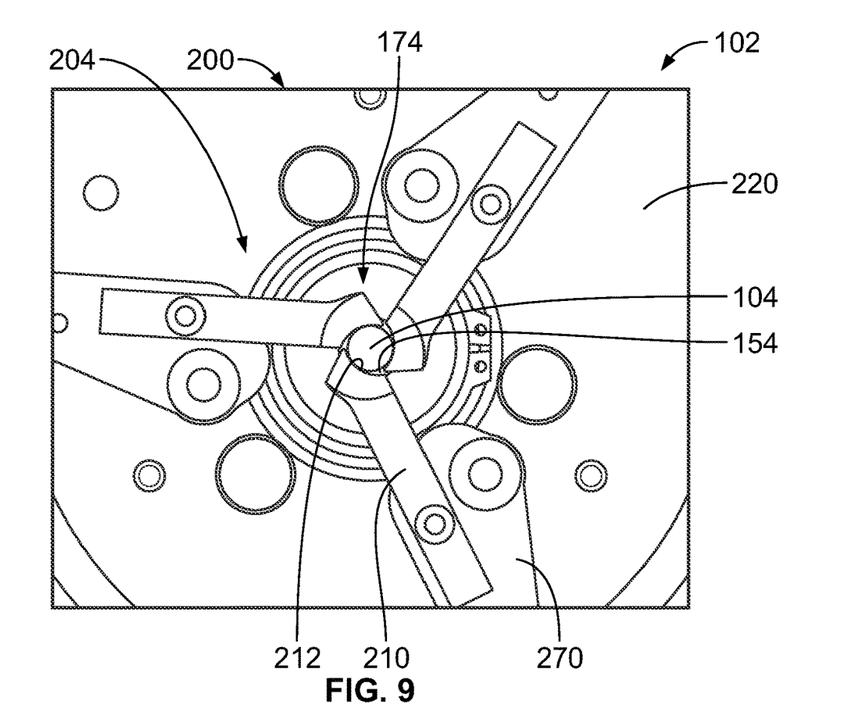
FIG. 9 is a front view of a portion of the cable cutting device in accordance with an exemplary embodiment showing the blades in a second cutting configuration cutting the cable.

FIG. 6 is a front view of a portion of the cable cutting device 102 in accordance with an exemplary embodiment showing the blades 210 open relative to the cable 104 in a non-cutting configuration. FIG. 7 is a front view of a portion of the cable cutting device 102 in accordance with an exemplary embodiment showing the blades 210 in a first cutting configuration cutting the outer insulator 152. FIG. 8 is a front view of a portion of the cable cutting device 102 in accordance with an exemplary embodiment showing the blades 210 cutting the outer insulator 152 at a different rotation position than the rotation position illustrated in FIG. 7. FIG. 9 is a front view of a portion of the cable cutting device 102 in accordance with an exemplary embodiment showing the blades 210 in a second cutting configuration cutting the inner insulator 154.

The pulley assembly 200 is driven from the open configuration (FIG. 6) to the first cutting configuration (FIG. 7 or FIG. 8) or the second cutting configuration (FIG. 9) by the drive assembly 202 (shown in FIG. 2). The rear pulley 222 is positioned at a different rotational position relative to the front pulley 220 in each of the illustrated positions. Rotation of the rear pulley 222 relative to the front pulley 220 causes actuation of the blade assembly 204. For example, the actuator 262 (shown in phantom in FIG. 7) engages the blade arm 270 and causes the blade arm 270 to pivot about the arm pivot pin 276 as the rear pulley 222 moves relative to the front pulley 220. Movement of the blade arm 270 causes movement of the blade 210 attached thereto. The pulley assembly 200 pivots the blade 210 about the cable opening 174 to open and close the blade 210 relative to the cable 104. The blades 210 are moved to different cutting depths for cutting the outer insulator 152 and the inner insulator 154. The cutting depths may be calibrated and/or programmed into the cable preparation machine 100 (FIG. 1) based on diameters of the insulators 152, 154. In an exemplary embodiment, the cable cutting device 102 is capable of cutting different diameter cables 104 by changing the cutting depths of the blades 210 and controlling the rotation of the pulley assembly 200 during use.

In an exemplary embodiment, the arcuate cutting edges 212 of the blades 210 are concave to follow the curvature of the cable 104. The radius of curvature of the arcuate cutting edges 212 may have a radius of curvature that more closely matches the radius of curvature of the outer insulator 152 than the inner insulator 154. In the illustrated embodiment, the lengths of the cutting edges 212 of the blades 210 are too short for cutting through the insulator 152 in a single cutting action. The blades 210 form an incomplete circle around the insulator 152, 154 leaving gaps between the ends of the cutting edges 212. As such, during use, the blades 210 are moved to a different rotational position (for example, compare FIG. 7 and FIG. 8) to cut through the insulator 152. In various embodiments, the blades 210 may be moved approximately 30° between the different cutting positions. Optionally, the blades 210 may be moved in a rotational cutting direction by rotating the pulley assembly 200 with the blades 210 in the closed position, thus causing the blades 210 to press through the insulator 152 as the pulley is rotated. However, in other various embodiments, the blades 210 are moved between the various rotational positions with the blades 210 in the open position (FIG. 6) and then closed in a radial cutting direction at the different rotational positions, such as in a chopping cutting action. For example, the pulley assembly 200 may be moved to the first rotational position and then operated to close or chop the blades 210 into the insulator 152 to form cuts in the insulator 152 in the shape of the blades 210. Webs of the insulator 152 material may remain between the cuts, such webs being removed by later, successive cuts. In an exemplary embodiment, the insulator 152 is pressed or smashed inward in a chopping manner as the blades 210 are closed in the radial inward cutting direction, rather than cleanly slicing through the insulator 152. The chopping or smashing of the material of the insulator 152 protects the layer interior of the insulator 152, such as the cable braid or the foil or the inner conductor. For example, the blades 210 may not pass entirely through the insulator 152 to the interior layer, leaving a small amount of the material of the insulator 152 between the cutting edge 212 and the metal layer interior of the insulator 152. The cutting edges 212 of the blades 210 are protected by reducing impact or engagement with metal structures of the cable 104.

The blades 210 may then be opened and the pulley assembly moved to the second rotational position. The pulley assembly 200 is then operated to again close or chop the blades 210 into the insulator 152 at the second rotational position to cut the next section of the insulator 152 (for example, to cut the webs of material). Such process may be repeated as necessary to cut the entire circumference of the insulator 152 in multiple chopping cuts. A similar process may be used for cutting the inner insulator 154. As such, the drive assembly 202 is operated to drive the pulley assembly 200 in a first drive configuration to actuate the blades 210 to a first depth to cut the outer insulator 152. The drive assembly 202 is operated to drive the pulley assembly 200 in a second drive configuration to actuate the blades 210 to a second depth to cut an inner insulator 154. The cable preparation machine 100 has the ability to precisely control cutting dynamics during the cutting process. For example, the cable preparation machine may control rotation direction of the front pulley 220, rotation direction of the rear pulley 222, rotation rate of the front pulley 220, rotation rate of the rear pulley 222, closing speed of the blades 210, rotation amount of the pulleys 220, 222, number of rotations of the pulleys 220, 222, number of chops of the blades 210, cutting depth of the blades 210. The cable preparation machine may be calibrated, such as using a fixed diameter mandrel or other calibration device.

Figure 10:
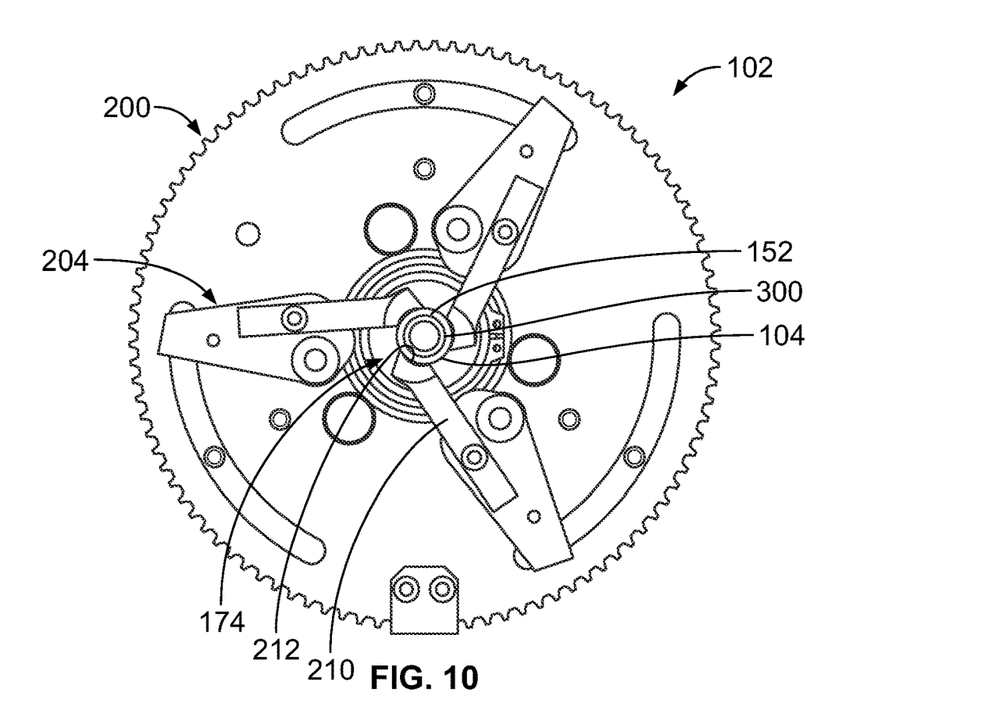
FIG. 10 is a front view of a portion of the cable cutting device in accordance with an exemplary embodiment showing the blades used for removing a cut slug of the cable.
Figure 11:
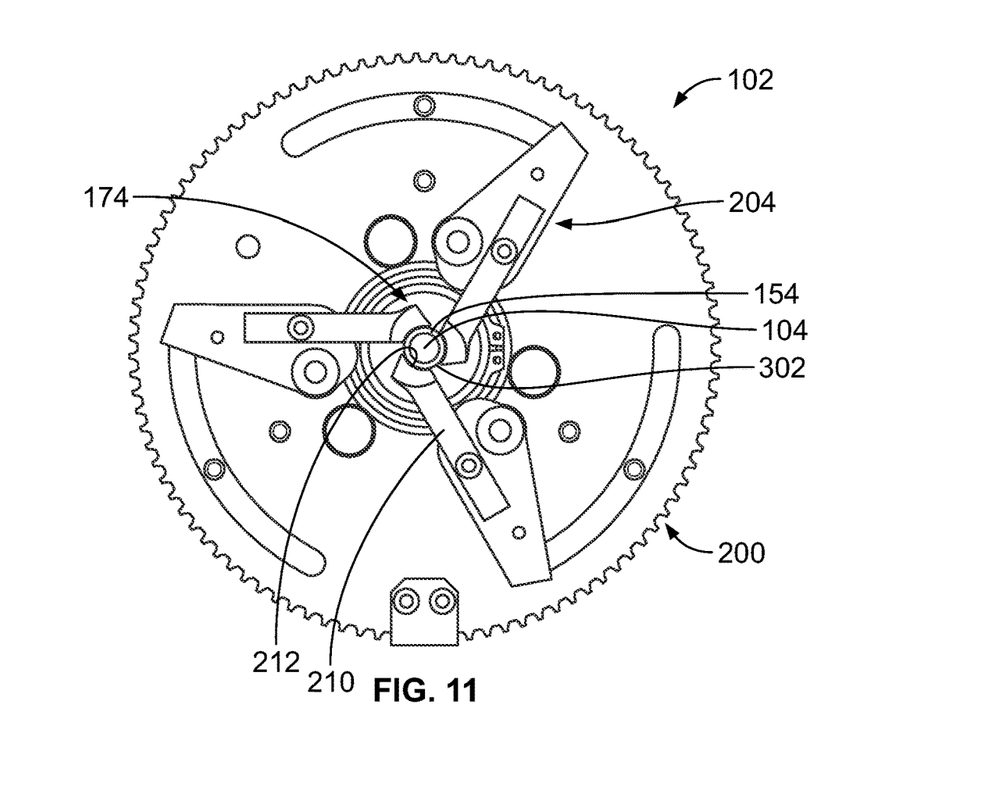
FIG. 11 is a front view of a portion of the cable cutting device in accordance with an exemplary embodiment showing the blades used for removing a cut slug of the cable.

FIG. 10 is a front view of a portion of the cable cutting device 102 in accordance with an exemplary embodiment showing the blades 210 used for removing a cut slug 300 of the outer insulator 152. FIG. 11 is a front view of a portion of the cable cutting device 102 in accordance with an exemplary embodiment showing the blades 210 used for removing a cut slug 302 of the inner insulator 154. After the outer insulator 152 or the inner insulator 154 is cut by the blade assembly 204, the blade assembly 204 may be used to remove the cut slugs 300 or 302, respectively. For example, the blades 210 may be moved to a partially released position, rather than the open position (FIG. 6). In the partially released position, the blades 210 are at a released and safe distance from the layer beneath the insulator 152 or 154 while keeping the blades 210 engaged with the insulator 152 or 154. As such, the inner layer(s) are able to be pulled outward from the blade assembly 204 without damaging or scraping along the inner layer(s). For example, the blades 210 may be released a distance less than a thickness of the insulator 152 or 154 such that the cutting edges 212 of the blades 210 do not clear the insulator 152 or 154, but rather are configured to engage the insulator 152, 154. The cable 104 may then be retracted from the cable opening 174 (for example, the cable 104 may be moved relative to the blade assembly 204) with the blade assembly 204 remaining in a fixed position holding the slug 300 or 302. Once the cable 104 clears the slug 300 or 302, the slug 300 or 302 may be discarded, such as by opening the blade assembly 204 allowing the slug 300 or 302 to fall away into the chute 134 (shown in FIG. 1).

In other various embodiments, the pulley assembly 200 may be operated to close the blades 210 around the cut slug 300 or 302 in a pinching manner rather than a cutting manner. The cable 104 may then be retracted from the cable opening 174 (for example, the cable 104 may be moved relative to the blade assembly 204) with the blade assembly 204 remaining in a fixed position holding the slug 300 or 302 relative to the pulley assembly 200 as the cable is retracted out of the slug 300 or 302. Once the cable 104 is pulled out of the slug 300 or 302, the slug 300 or 302 may be discarded. In various embodiments, the blade assembly 204 may be used for removing the slugs 300, 302 without using the blade assembly 204 to cut the insulators 152, 154. For example, another type of cutting device may be used, such as a laser cutting device that cuts the insulators 152, 154 and then the blade assembly 204 is used to remove the cut slugs 300, 302.

Figure 12:
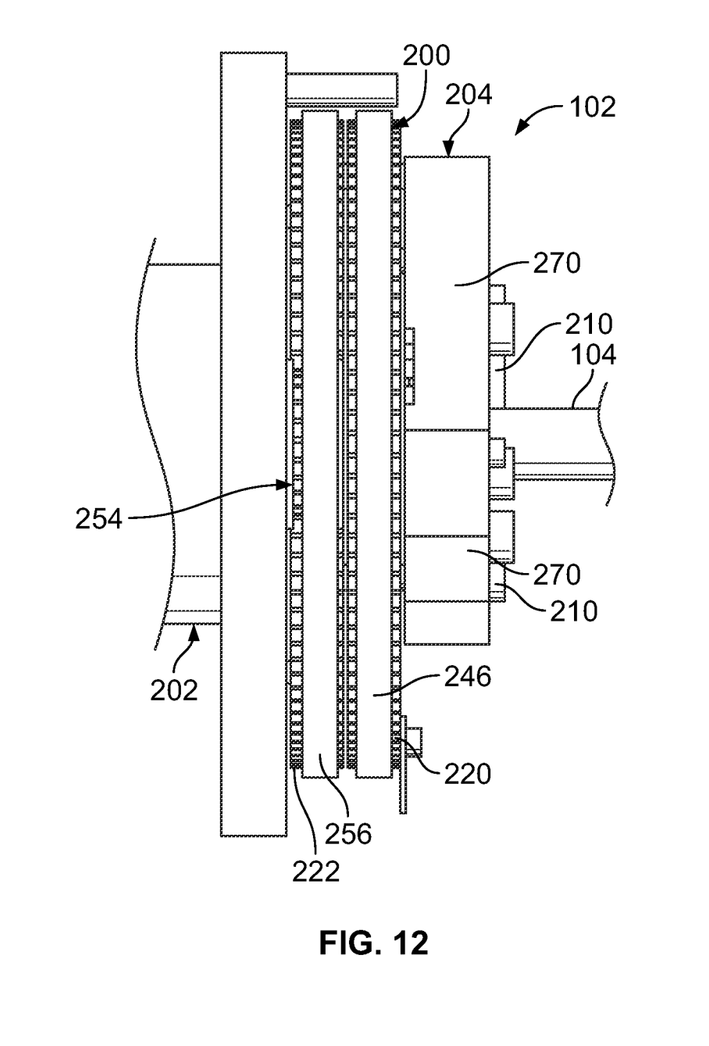
FIG. 12 is a side view of the cable cutting device in accordance with an exemplary embodiment.
Figure 13:
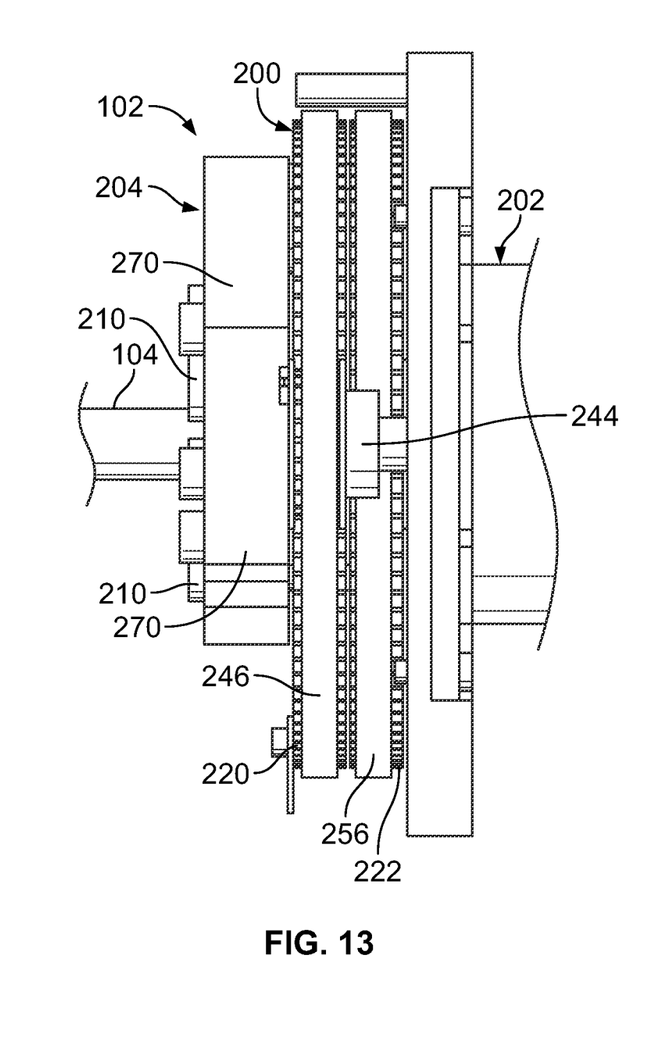
FIG. 13 is a side view of the cable cutting device in accordance with an exemplary embodiment.

FIG. 12 is a side view of the cable cutting device 102 illustrating the pulley assembly 200, a portion of the drive assembly 202 and the blade assembly 204. FIG. 13 is a side view of the cable cutting device 102 illustrating the pulley assembly 200, a portion of the drive assembly 202 and the blade assembly 204. FIG. 12 shows the second drive pulley 254 and the second drive belt 256 operably coupled to the rear pulley 222. FIG. 13 shows the first drive pulley 244 and the first drive belt 246 operably coupled to the front pulley 220. FIGS. 12 and 13 show the blade arms 270 of the blade assembly 204 coupled to the front of the front pulley 220. The cable 104 is illustrated extending into the cable cutting device 102.

The drive assembly 202 is operated to rotate the front pulley 220 and the rear pulley 222 to actuate the blade arms 270 of the blade assembly 204 in a first drive configuration to actuate the blade assembly 204 in a first direction for closing the blade assembly 204 toward the cable 104. The drive assembly 202 is operated to rotate the front pulley 220 and the rear pulley 222 to actuate the blade arms 270 of the blade assembly 204 in a second direction for opening the blade assembly 204 away from the cable 104. Different cutting operations may be performed by the single cable cutting device 102 without the need of removing the cable and inserting the cable into a different cable preparation machine. In various embodiments, the drive assembly 202 is operable in a drive configuration such that the first drive unit 230 rotates the front pulley 220 at a faster rate than the second drive unit 232 rotates the rear pulley 222 to actuate the blades 210 away from the insulator 152. In other various embodiments, the drive assembly 202 is operable in a drive configuration such that the second drive unit 232 rotates the rear pulley 222 at a faster rate than the first drive unit 230 rotates the front pulley 220 to actuate the blades 210 toward the cable 104 for cutting the insulator 152. In other various embodiments, the drive assembly 202 is operable in a drive configuration such that the first drive unit 230 and the second drive unit 232 rotate the front pulley 220 and the rear pulley 222 at a same rate.

Figure 14:
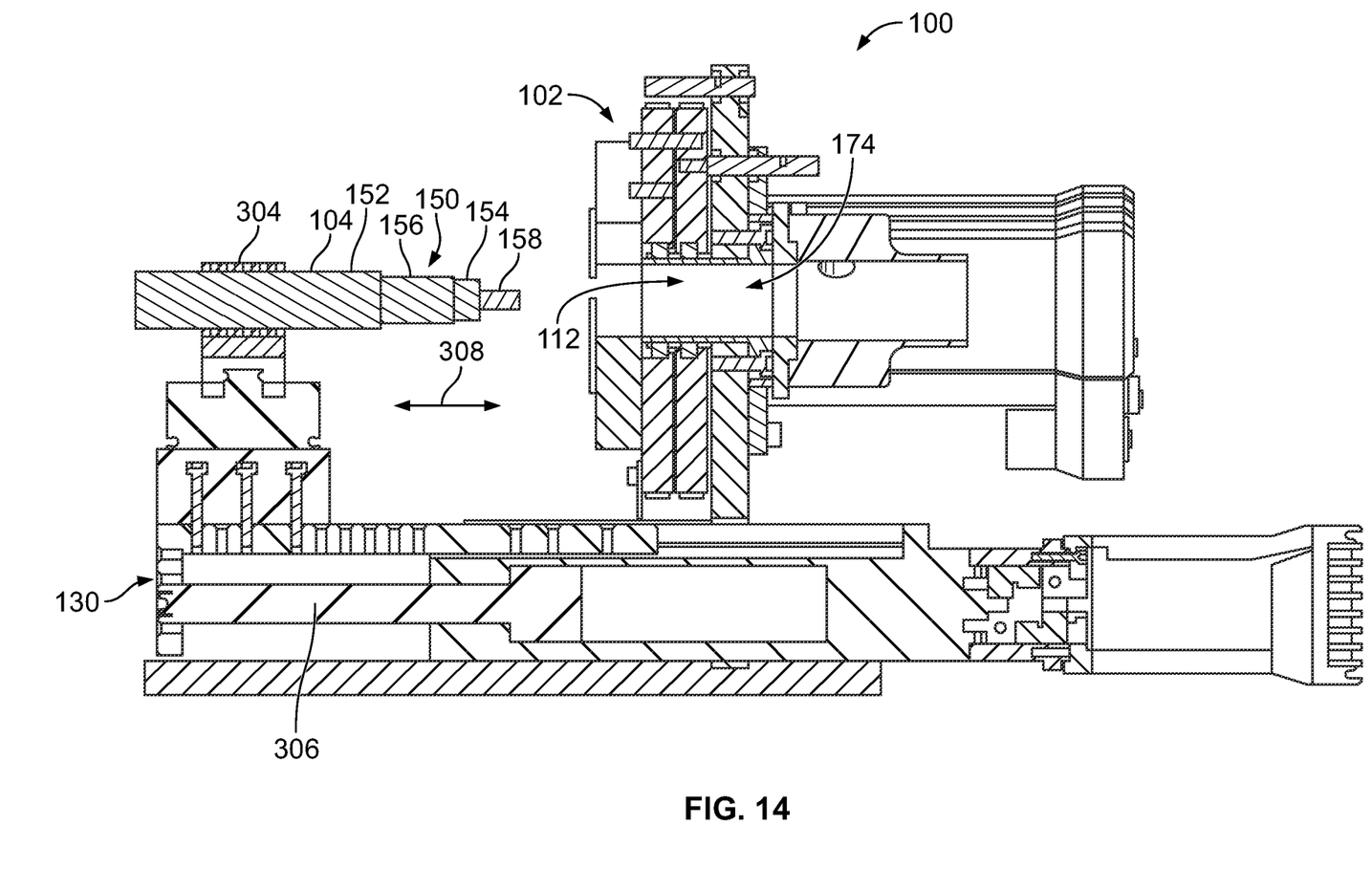
FIG. 14 is a partial sectional view of a portion of the cable preparation machine showing the cable cutting device and a cable holder in accordance with an exemplary embodiment.

FIG. 14 is a partial sectional view of a portion of the cable preparation machine 100 showing the cable cutting device 102 and the cable holder 130. The cable holder 130 includes a chuck 304 for holding the cable 104. The cable holder 130 includes a slide 306 for moving the chuck 304 toward and away from the cable cutting device 102. Once the cable 104 is secured in the chuck 304, the slide 306 moves the end 150 of the cable 104 into the cable opening 174 at the cable cutting zone 112. The cable cutting device 102 is operated with the cable 104 remaining in the cable holder 130 to remove the various layers of the cable 104 to prepare the end of the cable 104. The cable holder 130 may move the cable 104 forward and rearward relative to the cable cutting device 102 as shown by arrow 308, such as to remove the slugs 300, 302 (shown in FIGS. 12 and 13). The cable cutting device 102 is configured to remove a portion of the outer insulator 152 and a portion of the inner insulator 154 to expose the inner conductor 158 and to expose the cable braid 156 for termination of the cable 104 to another component. The cable cutting device 102 is able to remove each of the layers of the cable 104 without removing the cable 104 from the cable preparation machine 100. A single cable preparation machine 100 is able to perform multiple processing steps using the cable cutting device 102.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A cable preparation machine comprising:
a frame forming a cable cutting zone, the frame having a cable opening along a cable axis at the cable cutting zone receiving an end of a cable;
a drive assembly having a first drive unit and a second drive unit;
a pulley assembly rotatably coupled to the frame about the cable axis, the pulley assembly including a front pulley operably coupled to the first drive unit and a rear pulley operably coupled to the second drive unit, the front pulley being rotatable in a forward direction and a reverse direction by the first drive unit, the rear pulley being rotatable in a forward direction and a reverse direction by the second drive unit independent of the rotation of the front pulley; and
a blade assembly operably coupled to the pulley assembly, the blade assembly having a blade pivotably coupled to the front pulley, the blade having an arcuate cutting edge configured for cutting an insulator of the cable.

2. The cable preparation machine of claim 1, wherein the pulley assembly pivots the blade about the cable opening to open and close the blade relative to the cable.

3. The cable preparation machine of claim 1, wherein the blade assembly is movable relative to the pulley assembly to change a cutting depth of the blade assembly.

4. The cable preparation machine of claim 1, wherein the blade is a first blade, the blade assembly including a second blade and a third blade cooperatively actuated relative to the cable to cut the insulator.

5. The cable preparation machine of claim 4, wherein the blade assembly is movable to a first rotational position and the first blade, the second blade, and the third blade are actuated in a radially inward cutting direction in a first chopping action to cut the insulator such that webs of the insulator remain between the cuts of the first blade, the second blade and the third blade, and wherein the blade assembly is movable to a second rotational position and the first blade, the second blade, and the third blade are actuated in a radially inward cutting direction in a second chopping action to cut the webs of the insulator.

6. The cable preparation machine of claim 1, wherein the arcuate cutting edge has a radius of curvature closely matching a radius of curvature of the cable.

7. The cable preparation machine of claim 1, wherein the blade is rotatable relative to the cable to cut the insulator.

8. The cable preparation machine of claim 1, wherein the blade is configured to cut the insulator in a radial cutting direction.

9. The cable preparation machine of claim 1, wherein the drive assembly is operated to drive the pulley assembly in a first drive configuration to actuate the blade to a first depth to cut the insulator, and wherein the drive assembly is operated to drive the pulley assembly in a second drive configuration to actuate the blade to a second depth to cut an inner insulator of the cable.

10. The cable preparation machine of claim 1, wherein the blade is sickle shaped.

11. The cable preparation machine of claim 1, wherein the front pulley is rotated faster than the rear pulley to actuate the blade in a first direction relative to the cable and the front pulley is rotated slower than the rear pulley to actuate the blade is a second direction relative to the cable.

12. The cable preparation machine of claim 1, wherein the blade assembly includes a blade arm holding the blade, the blade arm being pivotably coupled to the front pulley, the front pulley includes a slot, the rear pulley including an actuator extending from the rear pulley through the slot of the front pulley to engage the blade arm of the blade assembly, the actuator causing the blade arm to pivot when the front pulley is rotated at a different rate than the rear pulley.

13. The cable preparation machine of claim 1, wherein the first drive unit is operated independent of the second drive unit to cause relative movement between the front pulley and the rear pulley.

14. The cable preparation machine of claim 1, wherein the drive assembly is operable in a first drive configuration such that the first drive unit rotates the front pulley at a faster rate than the second drive unit rotates the rear pulley to actuate the blade of the blade assembly away from the insulator, and wherein the drive assembly is operable in a second drive configuration such that the second drive unit rotates the rear pulley at a faster rate than the first drive unit rotates the front pulley to actuate the blade of the blade assembly toward the cable for cutting the insulator, and wherein the drive assembly is operable in a third drive configuration such that the first drive unit and the second drive unit rotate the front pulley and the rear pulley at a same rate.

15. A cable preparation machine comprising:
a frame forming a cable cutting zone, the frame having a cable opening along a cable axis at the cable cutting zone receiving an end of a cable;
a pulley assembly rotatably coupled to the frame about the cable axis, the pulley assembly including a front pulley and a rear pulley rotatable relative to the front pulley, the rear pulley having an actuator; and
a blade assembly operably coupled to the pulley assembly, the blade assembly having a blade arm pivotably coupled to the front pulley, the blade arm being operably coupled to the actuator of the rear pulley, wherein the actuator pivots the blade arm relative to the front pulley upon relative rotation of the front pulley and the rear pulley, the blade assembly having a blade extending from the blade arm, the blade having an arcuate cutting edge configured for cutting an insulator of the cable; and a drive assembly operably coupled to the pulley assembly to rotate the pulley assembly about the cable axis, the drive assembly being operably coupled to the front pulley to rotate the front pulley, the drive assembly being operably coupled to the rear pulley to rotate the rear pulley, wherein the drive assembly is configured to rotate the rear and front pulleys independently from each other to actuate the blade assembly.

16. The cable preparation machine of claim 15, wherein the front pulley is rotated faster than the rear pulley to actuate the blade in a first direction relative to the cable and the front pulley is rotated slower than the rear pulley to actuate the blade is a second direction relative to the cable.

17. The cable preparation machine of claim 15, wherein the front pulley includes a slot, the actuator extending from the rear pulley through the slot of the front pulley to engage the blade arm of the blade assembly, the actuator causing the blade arm to pivot when the front pulley is rotated at a different rate than the rear pulley.

18. The cable preparation machine of claim 15, wherein the drive assembly includes a first drive unit operably coupled to the front pulley to rotate the front pulley and the drive assembly includes a second drive unit operably coupled to the rear pulley to rotate the rear pulley, the first drive unit being operated independent of the second drive unit to cause relative movement between the front pulley and the rear pulley.

19. The cable preparation machine of claim 18, wherein the drive assembly is operable in a first drive configuration such that the first drive unit rotates the front pulley at a faster rate than the second drive unit rotates the rear pulley to actuate the blade of the blade assembly away from the insulator, and wherein the drive assembly is operable in a second drive configuration such that the second drive unit rotates the rear pulley at a faster rate than the first drive unit rotates the front pulley to actuate the blade of the blade assembly toward the cable for cutting the insulator, and wherein the drive assembly is operable in a third drive configuration such that the first drive unit and the second drive unit rotate the front pulley and the rear pulley at a same rate.

20. The cable preparation machine of claim 15, wherein the blade is a first blade, the blade assembly including a second blade and a third blade cooperatively actuated relative to the cable to cut the insulator, the blade assembly is movable to a first rotational position and the first blade, the second blade, and the third blade are actuated in a radially inward cutting direction in a first chopping action to cut the insulator such that webs of the insulator remain between the cuts of the first blade, the second blade and the third blade, and wherein the blade assembly is movable to a second rotational position and the first blade, the second blade, and the third blade are actuated in a radially inward cutting direction in a second chopping action to cut the webs of the insulator.

* * * * *